(12) United States Patent
Ishiguro

(10) Patent No.: US 12,347,140 B2
(45) Date of Patent: Jul. 1, 2025

(54) CORNEAL REFLECTED IMAGE IDENTIFYING DEVICE AND GAZE DETECTION DEVICE

(71) Applicants: TOYOTA JIDOSHA KABUSHIKI KAISHA, Toyota (JP); AISIN CORPORATION, Kariya (JP)

(72) Inventor: Seiya Ishiguro, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 114 days.

(21) Appl. No.: 18/358,124

(22) Filed: Jul. 25, 2023

(65) Prior Publication Data

US 2024/0037787 A1 Feb. 1, 2024

(30) Foreign Application Priority Data

Jul. 26, 2022 (JP) .................................. 2022-118944

(51) Int. Cl.
*H04N 23/56* (2023.01)
*G06F 3/01* (2006.01)
(Continued)

(52) U.S. Cl.
CPC ................ *G06T 7/74* (2017.01); *G06F 3/013* (2013.01); *G06T 7/586* (2017.01); *H04N 23/56* (2023.01);
(Continued)

(58) Field of Classification Search
CPC . G06T 7/74; G06T 7/586; G06T 2207/10012; G06T 2207/10024;
(Continued)

(56) References Cited

U.S. PATENT DOCUMENTS 5,182,443 A 1/1993 Suda et al.
9,317,113 B1 * 4/2016 Karakotsios ........... G06V 40/18
(Continued)

FOREIGN PATENT DOCUMENTS

JP 2861349 B2 2/1999
JP 2017079883 A 5/2017
(Continued)

*Primary Examiner* — Timothy R Newlin
(74) *Attorney, Agent, or Firm* — Dickinson Wright, PLLC

(57) ABSTRACT

A corneal reflected image identifying device and gaze detection device enabling detection of a gaze with a high precision even when a person being monitored is wearing an object covering the eyes, in particular a corneal reflected image identifying device comprising a light projecting part 110 for projecting light from two light sources 110a, 110b which are spaced apart from each other toward an eye, a camera 120 for capturing an image of the eye on which light is projected, a distance calculating part 152d for using the captured image to calculate a distance between two reflected images for each combination of two reflected images among a plurality of reflected images obtained by light projected from the light sources 110a, 110b being reflected in a vicinity of the eye, and a corneal reflected image identifying part 152g for excluding a reflected image of light projected from the light sources 110a, 110b being reflected by an object covering the eye based on predetermined features and identifying a corneal reflected image to be used for gaze detection, wherein the predetermined features include the distance which the distance calculating part 152d has calculated.

5 Claims, 5 Drawing Sheets

(51) Int. Cl.
*G06T 7/586* (2017.01)
*G06T 7/73* (2017.01)

(52) U.S. Cl.
CPC .............. *G06T 2207/10012* (2013.01); *G06T 2207/10024* (2013.01); *G06T 2207/10048* (2013.01); *G06T 2207/30201* (2013.01); *G06T 2207/30268* (2013.01)

(58) Field of Classification Search
CPC . G06T 2207/10048; G06T 2207/30201; G06T 2207/30268; G06T 7/00; G06F 3/013; H04N 23/56; A61B 3/158; A61B 3/107
See application file for complete search history.

(56) References Cited

U.S. PATENT DOCUMENTS

| | | | | |
|---|---|---|---|---|
| 9,940,518 | B1* | 4/2018 | Klingström | G06V 40/193 |
| 10,288,879 | B1* | 5/2019 | Rana | G06F 3/013 |
| 2008/0137909 | A1* | 6/2008 | Lee | G06V 40/19 |
| | | | | 382/103 |
| 2013/0285901 | A1* | 10/2013 | Lee | G06F 3/0304 |
| | | | | 345/156 |
| 2015/0015478 | A1* | 1/2015 | Hoffman | G06F 3/013 |
| | | | | 345/156 |
| 2015/0287206 | A1* | 10/2015 | Ebisawa | G06T 7/593 |
| | | | | 382/154 |
| 2016/0004303 | A1* | 1/2016 | Arar | G06F 3/013 |
| | | | | 345/156 |
| 2017/0116736 | A1* | 4/2017 | Yoshioka | A61B 3/113 |
| 2017/0134643 | A1* | 5/2017 | Kim | G06V 40/171 |
| 2017/0243061 | A1* | 8/2017 | Nakashima | G06V 40/19 |
| 2018/0032133 | A1* | 2/2018 | Cho | G06F 3/013 |
| 2019/0147241 | A1* | 5/2019 | Shudo | A61B 3/0008 |
| | | | | 348/78 |
| 2019/0197690 | A1* | 6/2019 | Kang | G06T 7/11 |
| 2020/0233202 | A1* | 7/2020 | Derakhshani | G01B 11/25 |
| 2020/0257358 | A1* | 8/2020 | Rosell | G06V 10/44 |
| 2021/0349532 | A1* | 11/2021 | Kim | G06F 3/013 |
| 2022/0075983 | A1* | 3/2022 | Ohno | G06V 40/193 |
| 2022/0397956 | A1* | 12/2022 | Lundell | G02B 27/0093 |
| 2023/0162491 | A1* | 5/2023 | Akashi | G06V 10/141 |
| | | | | 382/117 |

FOREIGN PATENT DOCUMENTS

| | | |
|---|---|---|
| JP | 2018028728 A | 2/2018 |
| JP | 2018032198 A | 3/2018 |

* cited by examiner

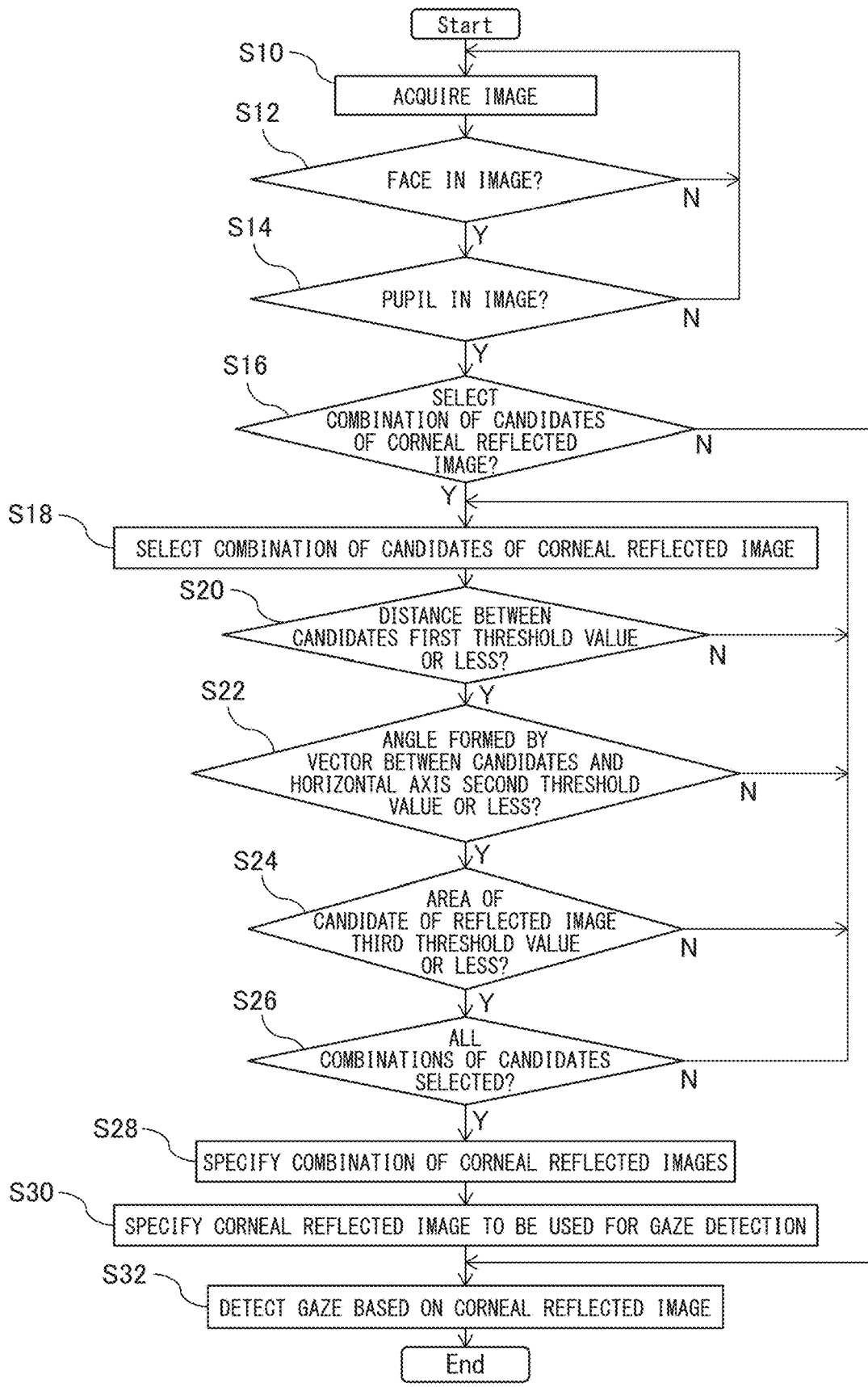

CORNEAL REFLECTED IMAGE IDENTIFYING DEVICE AND GAZE DETECTION DEVICE

FIELD

The present invention relates to a corneal reflected image identifying device and gaze detection device.

BACKGROUND

In the past, as described in Japanese Unexamined Patent Publication No. 2018-28728, there has been the art of using a plurality of synchronized cameras to generate a plurality of corneal reflected images and using the distances and angles of pairs of the same to select a correct corneal reflected image at each camera.

SUMMARY

Technical Problem

If projecting light to an eye and using a reflected image of the light at the cornea to detect a gaze, if the person being monitored is wearing eyeglasses, the image of the projected light reflected at the lens, frame, etc. of the eyeglasses might be mistakenly detected as the reflected image of the cornea. Further, if such mistaken detection occurs, there is the problem of a drop in the precision of detection of the gaze.

The art described in the above patent literature uses a plurality of synchronized cameras to generate a plurality of corneal reflected images, but there is one corneal reflected image corresponding to one camera. The true corneal reflected images of the cameras are selected to expand the range of gaze detection. For this reason, the art described in the patent literature is art predicated on the presence of a corneal reflected image of reflection at the cornea. When detecting the gaze of an eyeglass wearer, the problem remains of an image reflected at the lens, frame, etc. of the eyeglass being mistakenly detected as a reflected light of the cornea.

Therefore, the present invention has as its object the provision of a corneal reflected image identifying device and gaze detection device enabling detection of a gaze with a high precision even if a person being monitored is wearing an object covering the eyes.

Solution to Problem

According to one embodiment, a corneal reflected image identifying device is provided. This corneal reflected image identifying device is comprised of a light projecting part for projecting light from two light sources which are spaced apart from each other toward an eye, an imaging part for capturing an image of the eye on which light is projected, a distance calculating part for using the captured image to calculate a distance between two reflected images for each combination of two reflected images among a plurality of reflected images obtained by light projected from the light sources being reflected in a vicinity of the eye, and a corneal reflected image identifying part for excluding a reflected image of light projected from a light source being reflected by an object covering the eye based on predetermined features and identifying a corneal reflected image to be used for gaze detection, wherein the predetermined features include the distance which the distance calculating part has calculated.

In this corneal reflected image identifying device, the corneal reflected image identifying part preferably excludes a combination of two reflected images where the distance exceeds a first threshold value and identifies one reflected image included in a combination of two reflected images where the distance is the first threshold value or less as a corneal reflected image to be used for gaze detection.

In this corneal reflected image identifying device, preferably an angle calculating part for calculating an angle of a line connecting two reflected images with a line connecting the two light sources when viewed from the imaging direction of the imaging part for each combination of two reflected images is provided, the predetermined features include the angle which the angle calculating part has calculated, and the corneal reflected image identifying part excludes a combinations of two reflected images where the angle exceeds a second threshold value and identifies one reflected image included in a combination of two reflected images where the angle is the second threshold value or less as the corneal reflected image to be used for gaze detection.

In this corneal reflected image identifying device, preferably an area calculating part for calculating an area of a reflected image for each combination of two reflected images is provided, the predetermined features include the area which the area calculating part has calculated, and the corneal reflected image identifying part excludes a combination of two reflected images where an area exceeds a third threshold value and identifies one reflected image included in a combination of two reflected images where the areas are the third threshold value or less as the corneal reflected image to be used for gaze detection.

In this corneal reflected image identifying device, preferably a threshold value correcting part for correcting the first threshold value to a larger value the longer the distance from the light sources to the face is provided.

In this corneal reflected image identifying device, preferably a threshold value correcting part for correcting the third threshold value to a larger value the longer a distance from the light sources to the face is provided.

According to one embodiment, a gaze detection device is provided. This gaze detection device is provided with a gaze detecting part for detecting a gaze by a corneal reflection method based on a corneal reflected image identified by the above corneal reflected image identifying device.

Advantageous Effects of Invention

According to the present invention, the effect is exhibited that it becomes possible to provide a corneal reflected image identifying device and gaze detection device enabling detection of a gaze with a high precision even if a person being monitored is wearing an object covering the eyes.

BRIEF DESCRIPTION OF DRAWINGS

FIG. 9 is a flow chart showing processing which a processor of a control device performs for each predetermined control cycle.

DESCRIPTION OF EMBODIMENTS

Figure 1:
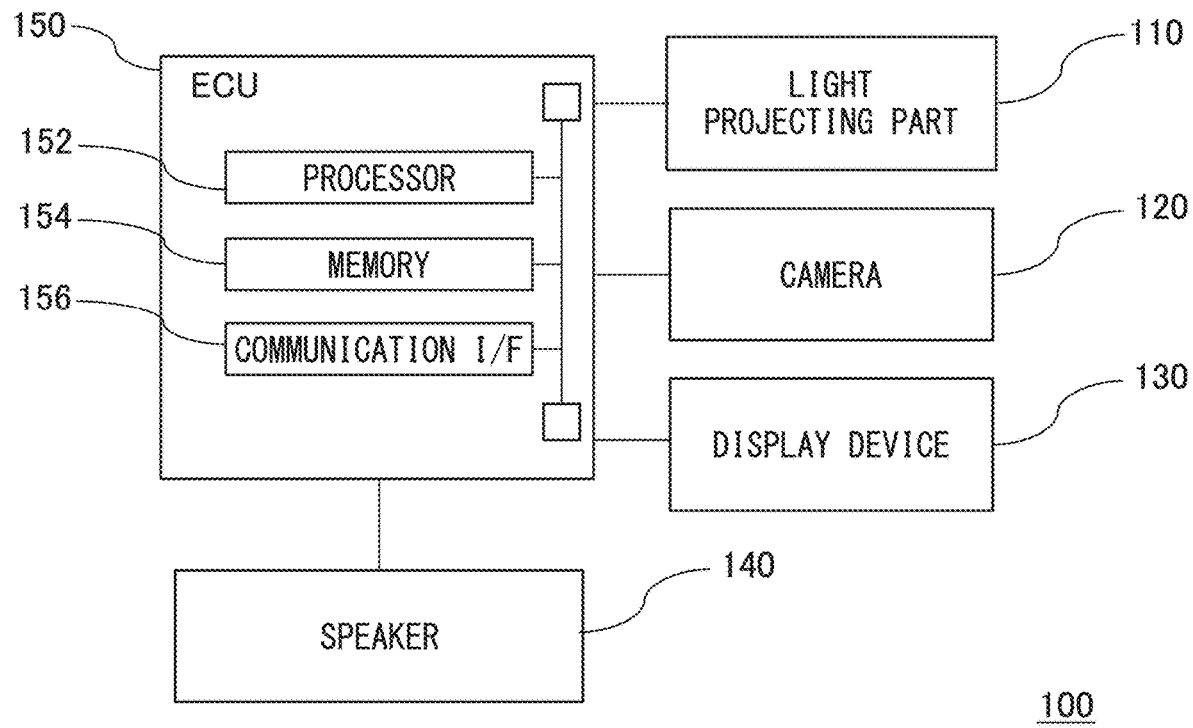
FIG. 1 is a schematic view of the configuration of an occupant assistance system in which a corneal reflected image identifying device and gaze detection device according to an embodiment are mounted.

FIG. 1 is a schematic view of the configuration of an occupant assistance system 100 in which a corneal reflected image identifying device and gaze detection device are mounted according to one embodiment. The occupant assistance system 100 is mounted in an automobile or other vehicle and detects a gaze of the driver or other occupant. Note that, in the following explanation, the case where the occupant is the driver will be explained as an example. The occupant assistance system 100 has a light projecting part 110 for projecting light toward a face of the driver, a camera 120 for capturing the face of the driver and generating an image, a display device 130 for displaying a warning to the driver etc., a speaker 140 for generating a warning etc. to the driver by voice, and a control device (ECU) 150. The light projecting part 110, camera 120, display device 130, speaker 140, and control device 150 are connected to be able to communicate through an internal vehicle network based on the Controller Area Network (CAN) standard.

The light projecting part 110 has two light sources which are spaced apart from each other and projects light from the two light sources toward an eye of the driver. The two light sources are, for example, comprised of near infrared light sources (near infrared LEDs) emitting near infrared light.

The camera 120 is one mode of the imaging part and has a 2D detector comprised of an array of photoelectric conversion elements having sensitivity to visible light or near infrared light such as CCDs or C-MOS's and an image-forming optical system for forming an image of an area to be captured on that 2D detector. The camera 120 is provided on a dashboard, steering column, the vicinity of the front glass, etc. at the inside of the vehicle facing the assumed position of the driver and captures the face of the driver. The camera 120 captures the eye of the driver to which the light projecting part 110 projected light every predetermined imaging cycle (for example, $\frac{1}{30}$ second to $\frac{1}{10}$ second) and generates an image in which the eye of the driver appears. Note that, the image obtained by the camera 120 is preferably a color image. Further, the camera 120 may be configured by a stereo camera and may be configured by obtaining the distance from the parallax of the left and right images to the different structures on the image. The camera 120 outputs the generated image every time generating an image through the internal vehicle network to the control device 150. Note that, as explained later, the camera 120 may be configured integrally with the light projecting part 110.

The display device 130 is, for example, configured from a liquid crystal display device (LCD) etc. and is provided at the instrument panel or the vicinity of the dashboard etc. and displays a warning to the driver in accordance with need. The speaker 140 is provided in the vicinity of the dashboard etc. and in accordance with need issues a warning by voice to the driver.

The control device 150 is a constituent element controlling the occupant assistance system 100 as a whole. The corneal reflected image identifying device and gaze detection device according to the present embodiment is configured by the control device 150, light projecting part 110, and camera 120. The control device 150 has a processor 152, memory 154, and communication interface (I/F) 156. The processor 152 further has one or more CPUs (central processing units) and their peripheral circuits. The processor 152 may further have another processing circuit such as a logical operation unit, numerical operation unit, or graphic processing unit. The memory 154, for example, has a volatile semiconductor memory and nonvolatile semiconductor memory and stores programs, data, etc. relating to processing according to the present embodiment. The communication interface 156 has an interface circuit for connecting the control device 150 to the internal vehicle network.

The control device 150 detects the gaze of the driver. Note that, in the present embodiment, "detecting the gaze" means detecting the direction of the gaze (angle of gaze). As the technique for calculating the gaze angle, the technique of utilizing a reflected image of a near infrared light source at the corneal surface (Purkinje image) and calculating the gaze angle from the distance between the center of the pupil and the Purkinje image, the technique of using the center of curvature of the cornea obtained from the Purkinje image and calculating the line connecting the center of curvature of the cornea and the center of the pupil as the gaze angle, etc. are known. In the present embodiment, these techniques use the corneal reflected image (below, also referred to as the "corneal reflection method") to detect the gaze of the driver.

When detecting the gaze of the driver, if the driver is wearing eyeglasses, the near infrared light which the light projecting part 110 projects is reflected by the frame or lens etc. of the eyeglasses. There is the possibility of the reflected image of the eyeglasses caused by this being mistakenly detected as reflected light of the pupil or cornea. If such mistaken detection occurs, the precision of gaze detection falls. In particular, in the case of a single-lens camera, this cannot be handled by interpolation by increasing the number of cameras or geometric techniques, so it is difficult to suitably deal with mistaken detection due to a reflected image of reflection at the eyeglasses and there is a possibility of the precision of gaze detection falling.

In the present embodiment, by projecting light toward an eye of a driver from a light projecting part 110 having two light sources which are spaced apart from each other, two corneal reflected images appear for one eye. Further, eyeglass reflected images are excluded based on a distance between two points of the reflected images, an angle of a line connecting two points of the reflected images, and areas of the reflected images, so eyeglass reflected images are kept from being mistakenly detected as corneal reflected images. Due to this, even in the case of an eyeglass wearer, more accurate gaze detection becomes possible. Note that, in the present embodiment, eyeglasses were illustrated as the object covering the eye, but in the case of wearing sunglasses, a face shield, goggles, or other transparent or semitransparent object covering the eyes as well, in the same way, mistaken detection due to a reflected image of reflection at these objects is suppressed and more accurate gaze detection is realized.

Figure 2:
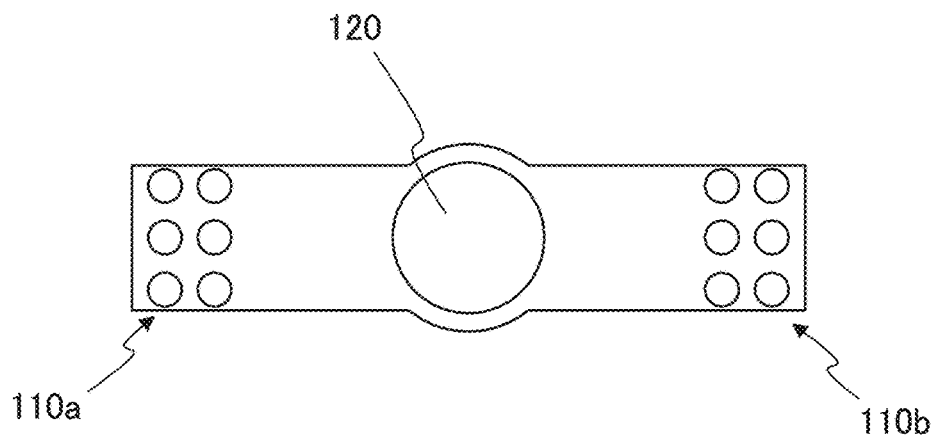
FIG. 2 is a schematic view showing a camera unit comprised of a light projecting part and a camera integrally joined.
Figure 3:
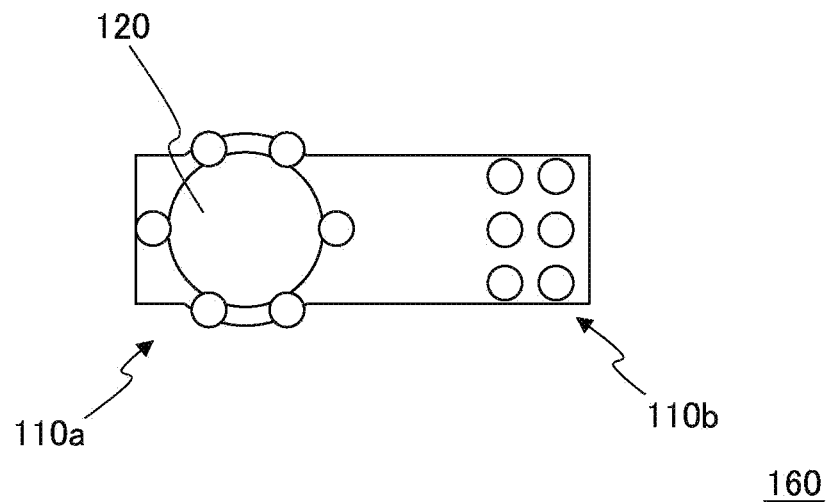
FIG. 3 is a schematic view showing a camera unit comprised of a light projecting part and a camera integrally joined.

FIG. 2 and FIG. 3 are schematic views showing a camera unit 160 comprised of a light projecting part 110 and a camera 120 integrally joined. FIG. 2 and FIG. 3 show the appearance of the camera unit 160 seen from the direction of the optical axis of an image-forming optical system of the camera 120. The camera unit 160 shown in FIG. 2 has a camera 120, a light source 110a provided at a left side of the camera 120 in the horizontal direction when viewing the camera unit 160 from the front face, and a light source 110b provided at a right side of the camera 120 in the horizontal direction when viewing the camera unit 160 from the front face. Further, the camera unit 160 shown in FIG. 3 has a camera 120, a light source 110a provided so as to surround the camera 120, and a light source 110b provided at a right side of the camera 120 in the horizontal direction when viewing the camera unit 160 from the front surface. The light source 110a and light source 110b shown in FIG. 2 and FIG. 3 are respectively comprised of sets of pluralities of point light sources. Note that, below, the case where the light projecting part 110 and the camera 120 are comprised of the camera unit 160 shown in FIG. 2 or FIG. 3 will be explained as an example.

Figure 4:
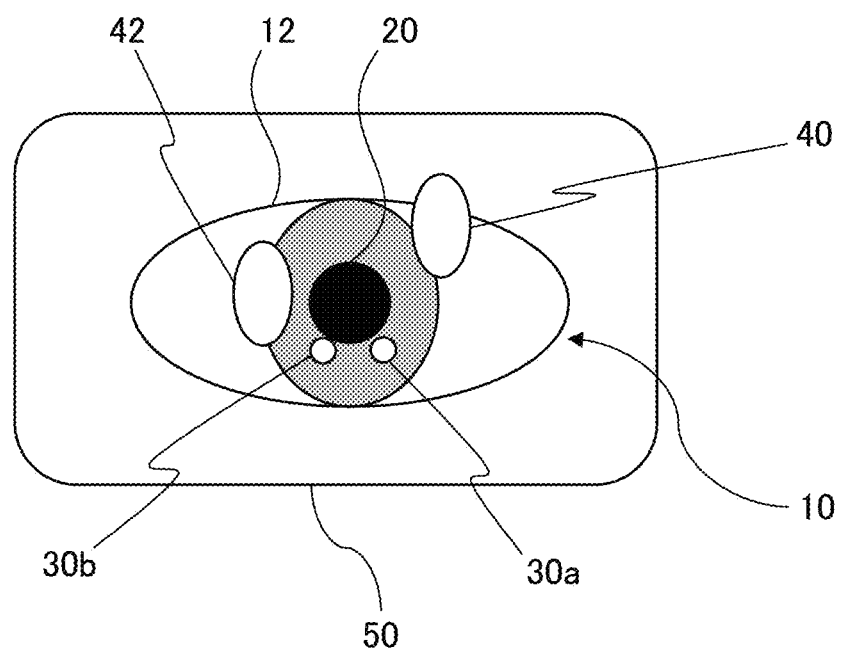
FIG. 4 is a view showing an image, in which an eye of a driver is appeared, generated by capturing an image of the eye of a driver wearing eyeglasses by a camera unit shown in FIG. 2 or FIG. 3.

FIG. 4 is a view showing an image 50, in which an eye 10 of a driver is appeared, generated by capturing an image of the eye of a driver wearing eyeglasses by a camera unit 160 shown in FIG. 2 or FIG. 3. As shown in FIG. 4, in the image 50, the contours 12 and the pupil 20 of the eye 10 appear. At the vicinity of the pupil 20, the corneal reflected image 30a of the light of the light source 110a reflected at the cornea and the corneal reflected image 30b of the light of the light source 110b reflected at the cornea appear. Further, at the vicinity of the pupil 20, the two images of the eyeglass reflected image 40 and eyeglass reflected image 42 reflected at the eyeglasses appear. Specifically, the eyeglass reflected image 40 and eyeglass reflected image 42 are reflections of light of the light sources 110a, 110b reflected at the frame, lenses, etc. of the eyeglasses.

As shown in FIG. 4, in an image 50 generated by capturing an eye of a driver wearing eyeglasses, eyeglass reflected images 40, 42 appear. If the eyeglass reflected images 40, 42 are mistakenly judged as reflected images of the cornea and the eyeglass reflected image 40 or the eyeglass reflected image 42 is utilized to detect the gaze of the driver, the gaze of the driver will be mistakenly detected.

The corneal reflected image 30a and corneal reflected image 30b are reflected images of the light source 110a and light source 110b at the cornea, so the distance between the corneal reflected image 30a and the corneal reflected image 30b is a value kept within a certain extent in advance in accordance with the distance between the light source 110a and light source 110b.

On the other hand, the eyeglass reflected image 40 or the eyeglass reflected image 42 is an image of light of the light source 110a or the light source 110b reflected at the eyeglasses outside from the cornea, so the distance between the eyeglass reflected image 40 and the eyeglass reflected image 42 or the distance between either of the eyeglass reflected image 40 and the eyeglass reflected image 42 and either of the corneal reflected image 30a and the corneal reflected image 30b usually becomes larger than the distance between the corneal reflected image 30a and the corneal reflected image 30b. Further, the distance between the eyeglass reflected image 40 and the eyeglass reflected image 42 also usually becomes larger than the distance between the corneal reflected image 30a and the corneal reflected image 30b.

In the present embodiment, if extracting two reflected images from the image 50, finding the distance between the two extracted reflected images, and the found distance is a predetermined value or less, it is judged that the two extracted reflected images are the corneal reflected image 30a and the corneal reflected image 30b. In this case, the direction of the gaze of the driver is accurately detected by the corneal reflection method using the corneal reflected image 30a or corneal reflected image 30b. On the other hand, if extracting two reflected images from the image 50, finding the distance between the two extracted reflected images, and the found distance is larger than a predetermined value, it is judged that at least one of the two extracted reflected images is the eyeglass reflected image 40 or the eyeglass reflected image 42.

In this case, mistaken judgment of the gaze is suppressed by not detecting the gaze based on these two reflected images.

On the other hand, in rare cases the distance between either one of the eyeglass reflected image 40 and eyeglass reflected image 42 and either one of the corneal reflected image 30a and corneal reflected image 30b will become the above-mentioned predetermined value or less.

Further, in rare cases the distance between the eyeglass reflected image 40 and the eyeglass reflected image 42 will become the above-mentioned predetermined value or less. For this reason, the eyeglass reflected image is excluded based on the angle of a line connecting two points of the reflected images.

So long as the reflection surface is not complicated in shape, the orientation of connection of the two light sources 110a, 110b and the orientation of connection of the reflected images at the reflection surface will become the same. Therefore, the angle of the line connecting the two corneal reflected images depends on the angle of the line connecting the two light sources 110a, 110b and, when seen from the imaging direction, generally matches the angle of the line connecting the two light sources 110a, 110b. As shown in FIG. 2 and FIG. 3, in the camera unit 160, the two light sources 110a and light source 110b are arranged in the horizontal direction, so as shown in FIG. 4, the corneal reflected image 30a of the light of the light source 110a reflected at the cornea and the corneal reflected image 30b of the light of the light source 110b reflected at the cornea appear in a state aligned in the horizontal direction in the image 50.

On the other hand, if the reflected images include an eyeglass reflected image, since the eyeglass reflected image is an image of the light of the light source 110a or light source 110b reflected at the frame or lens of the eyeglasses or other reflection surface of the eyeglasses and the reflection surface of the eyeglasses faces a random direction, when viewed from the imaging direction, the angle of the line connecting the reflected image of the eyeglasses and a corneal reflected image will not match the angle of the line connecting the two light sources 110a, 110b. Similarly, the angle of the line connecting the two reflected images of the eyeglasses will not match the angle of the line connecting the two light sources 110a, 110b.

Therefore, in FIG. 4, the eyeglass reflected image 40 and the eyeglass reflected image 42 basically will never be aligned horizontally and the line connecting the eyeglass reflected image 40 and the eyeglass reflected image 42 will not become horizontal. Similarly, the line connecting either one of the eyeglass reflected image 40 and eyeglass reflected image 42 and either one of the corneal reflected image 30a and corneal reflected image 30b will not become horizontal.

In the present embodiment, if extracting two reflected images from the image 50, finding an angle of a line connecting the two extracted reflected images, and the found angle is horizontal, it is judged that the two extracted reflected images are the corneal reflected image 30a and the corneal reflected image 30b. In this case, the direction of the gaze of the driver is accurately detected by the corneal reflection method using the corneal reflected image 30a or the corneal reflected image 30b. On the other hand, if extracting two reflected images from the image 50, finding an angle of a line connecting the two extracted reflected images, and the found angle is not horizontal, it is judged that at least one of the two extracted reflected images is the eyeglass reflected image 40 or the eyeglass reflected image 42. In this case, mistaken judgment of the gaze is suppressed by not detecting the gaze based on these two reflected images.

Furthermore, an area of a corneal reflected image becomes smaller than an area of a reflected image of the eyeglasses due to the curvature and size of the reflection surface. The sizes of the light sources 110a, 110b are set in advance so that the corneal reflected images 30a, 30b become the minimum limit sizes required for detecting the gaze by the corneal reflection method. For this reason, the size of the corneal reflected image 30a of the light of the light source 110a reflected at the cornea in the image 50 becomes a size according to the size of the light source 110a. Similarly, the size of the corneal reflected image 30b of the light of the light source 110b reflected at the cornea in the image 50 becomes a size according to the size of the light source 110b. On the other hand, the eyeglass reflected image 40 or the eyeglass reflected image 42 is an image of the light of the light source 110a or light source 110b reflected at the frame or lens of the eyeglasses or other reflection surface of the eyeglasses. The size of the eyeglass reflected image 40 or eyeglass reflected image 42 becomes greater than the size of the corneal reflected image 30a or corneal reflected image 30b due to the difference between the curvature of the reflection surface of the eyeglasses and the curvature of the cornea or the difference between the size of the reflection surface of the eyeglasses and the size of the cornea.

In the present embodiment, if extracting a reflected image from the image 50, finding the area of the extracted reflected image, and the found area is a predetermined value or less, it is judged that the extracted reflected image is the corneal reflected image 30a or the corneal reflected image 30b. In this case, the direction of the gaze of the driver is accurately detected by the corneal reflection method using the corneal reflected image 30a or corneal reflected image 30b. On the other hand, if extracting a reflected image from the image 50, finding the area of the extracted reflected image, and the found area is larger than a predetermined value, it is judged that the extracted reflected image is the eyeglass reflected image 40 or the eyeglass reflected image 42. In this case, mistaken judgment of the gaze is suppressed by not detecting the gaze based on the extracted reflected image.

Note that, if there is clearly no eyeglass reflected image present in the image, the processing for identifying the corneal reflected image based on a distance between two points of the reflected images, an angle of the line connecting two points of the reflected images, or areas of the reflected images need not be performed. For example, if there are only two reflected images in the image, it may be considered that there is no eyeglass reflected image present and the two reflected images are corneal reflected images of light of the two light sources 110a, 110b reflected at the cornea, so processing for identifying the corneal reflected images need not be performed.

Figure 5:
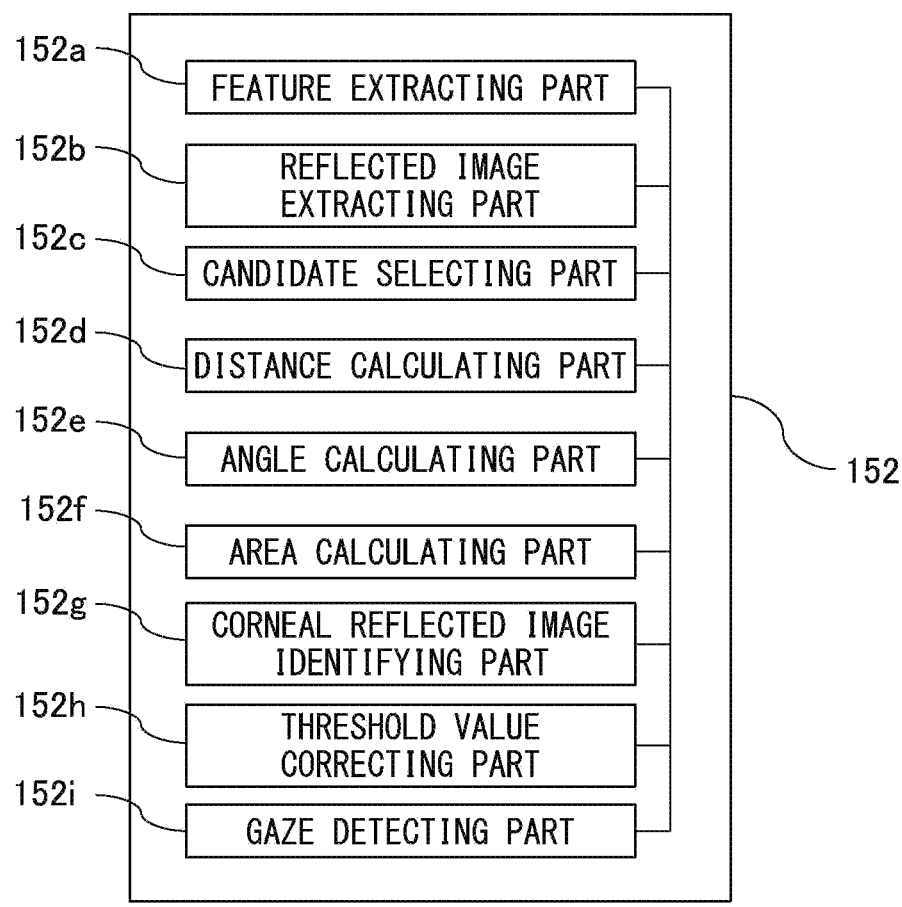
FIG. 5 is a schematic view showing function blocks of a processor of a control device.

FIG. 5 is a schematic view showing the function blocks of the processor 152 of the control device 150 for the above such processing. The processor 152 of the control device 150 has a feature extracting part 152a, reflected image extracting part 152b, candidate selecting part 152c, distance calculating part 152d, angle calculating part 152e, area calculating part 152f, corneal reflected image identifying part 152g, threshold value correcting part 152h, and gaze detecting part 152i. These parts which the processor 152 have are, for example, function modules realized by a computer program operating on the processor 152. That is, the function blocks of the processor 152 are comprised of the processor 152 and the program (software) for making it function. Further, this program may be recorded in a memory 154 which the control device 150 is provided with or a recording medium connected from the outside. Alternatively, these parts which the processor 152 has may be dedicated processing circuits provided in the processor 152.

The feature extracting part 152a of the processor 152 judges if a face of a driver appears in the image generated by the camera 120 capturing the image of the driver and, if the face of the driver appears, extracts the image corresponding to the face of the driver. Further, if the face of the driver appears in the image, the feature extracting part 152a judges whether an eye (pupil) appears in the extracted image corresponding to the face of the driver. At this time, the feature extracting part 152a extracts an image of the face of the driver from the image which the camera 120 generates by, for example, template matching of a template image in which a face appears and the image which the camera 120 generates or by input of an image which the camera 120 generates into a discriminator trained by machine learning for face detection. Similarly, the feature extracting part 152a extracts a contour 12 of an eye such as shown in FIG. 4 and further extracts the pupil 20 by, for example, template matching of a template image in which an eye appears and the image which the camera 120 generates or by input of an image which the camera 120 generates into a discriminator trained by machine learning for detection of an eye.

If an eye of the driver appears in the image which the camera 120 generates, the reflected image extracting part 152b of the processor 152 extracts the plurality of reflected images obtained by near infrared light projected from the light sources 110a, 110b being reflected in the vicinity of the eye. More specifically, the reflected image extracting part 152b extracts the reflected images of near infrared light which the light source 110a and light source 110b project by extracting the reflected images of near infrared light in the vicinity of the pupil 20. The reflected images of near infrared light which the reflected image extracting part 152b extracts include, in addition to the corneal reflected image 30a and corneal reflected image 30b, the eyeglass reflected image 40 and eyeglass reflected image 42.

The candidate selecting part 152c of the processor 152 selects combinations of two reflected images becoming candidates of corneal reflected images from among the plurality of reflected images of near infrared light which the reflected image extracting part 152b extracts. If there are reflected images already judged not to be corneal reflected images by the later explained processing among the plurality of reflected images of near infrared light which the reflected image extracting part 152b extracts, the candidate selecting part 152c excludes the reflected images judged not to be corneal reflected images in order to select the combinations of two reflected images becoming candidates of corneal reflected images.

The distance calculating part 152d of the processor 152 calculates the distance between two reflected images which the candidate selecting part 152c selects for each of the combinations of two reflected images. At this time, the distance calculating part 152d may find the centers of gravity of the reflected images and calculate the distance between the centers of gravity in order to calculate the distance between the two reflected images. Further, the distance calculating part 152d may also find the number of pixels between these centers of gravity on the image in order to calculate the distance between two reflected images.

Figure 6:
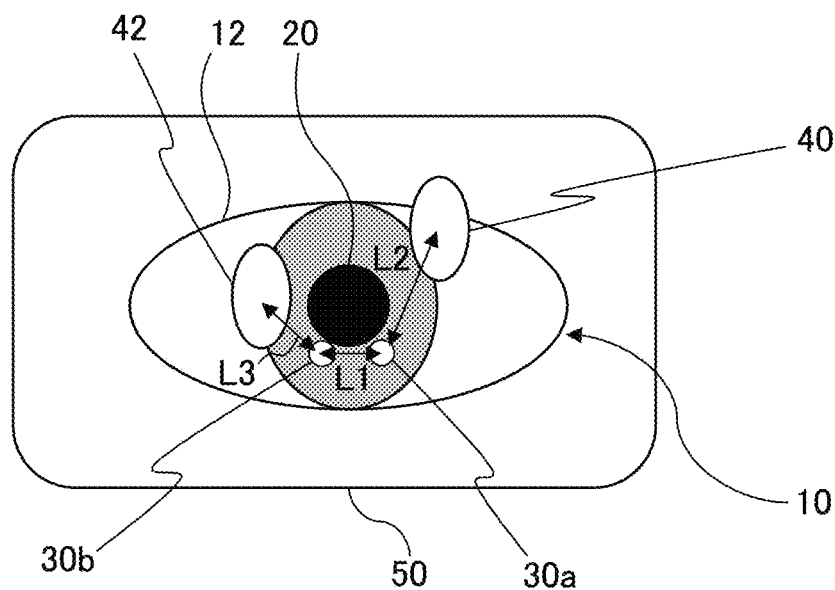
FIG. 6 is a schematic view showing a state of a distance calculating part calculating a distance between two candidates of reflected images in the example of FIG. 4.

FIG. 6 is a schematic view showing the state of the distance calculating part 152d calculating the distance between two candidates of reflected images in the example of FIG. 4. As shown in FIG. 6, if the two reflected images which the candidate selecting part 152c selects are the corneal reflected image 30a and corneal reflected image 30b, the distance calculating part 152d calculates the distance L1 between the corneal reflected image 30a and the corneal reflected image 30b. Further, if the two reflected images which the candidate selecting part 152c selects are the corneal reflected image 30a and the eyeglass reflected image 40, the distance calculating part 152d calculates the distance L2 between the corneal reflected image 30a and the eyeglass reflected image 40. Further, if the two reflected images which the candidate selecting part 152c selects are the corneal reflected image 30b and the eyeglass reflected image 42, the distance calculating part 152d calculates the distance L3 between the corneal reflected image 30b and the eyeglass reflected image 42.

The angle calculating part 152e of the processor 152 calculates an angle of a line connecting two reflected images with a line connecting the two light sources 110a, 110b when viewed from the imaging direction of the camera 120 for the combination of two reflected images which the candidate selecting part 152c selects. As a more specific example, if the two light sources 110a, 110b are arranged in the horizontal direction, the angle calculating part 152e calculates the angle formed by the line connecting the combination of two reflected images which the candidate selecting part 152c selects with the horizontal. At this time, the distance calculating part 152d may also find the centers of gravity of the reflected images and calculate the angle formed by the line connecting the centers of gravity with the horizontal.

Figure 7:
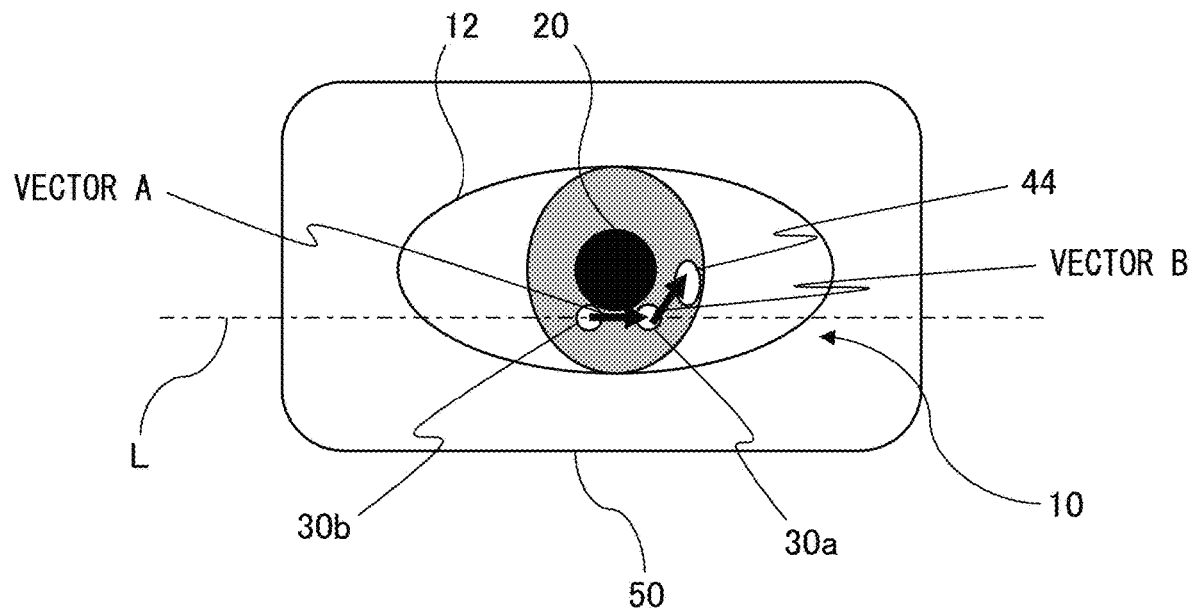
FIG. 7 is a schematic view showing a state of an angle calculating part calculating an angle formed by a line connecting two candidates of reflected images with the horizontal.
Figure 8:
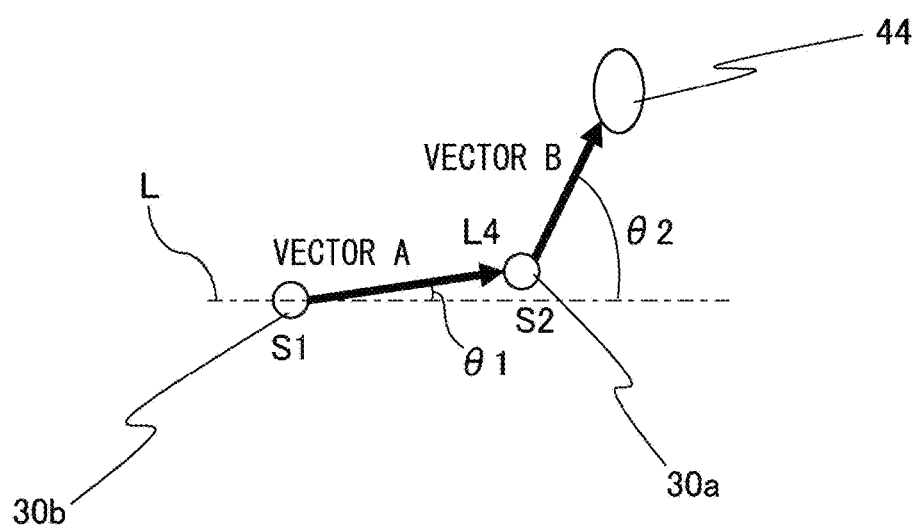
FIG. 8 is a view showing enlarged a positional relationship between the two images of a corneal reflected image and eyeglass reflected image shown in FIG. 7.

FIG. 7 is a schematic view showing a state of an angle calculating part 152e calculating an angle formed by a line connecting two candidates of reflected images with the horizontal. In the example shown in FIG. 7, two images of the corneal reflected image 30a and corneal reflected image 30b and one eyeglass reflected image 44 appear in the image 50. Further, FIG. 8 is a view showing enlarged a positional relationship between the corneal reflected image 30a, corneal reflected image 30b, and eyeglass reflected image 44 shown in FIG. 7. As shown in FIG. 7 and FIG. 8, if the two reflected images which the candidate selecting part 152c selects are the corneal reflected image 30a and the corneal reflected image 30b, the angle θ1 which the vector A having the corneal reflected image 30b as its start point and the corneal reflected image 30a as its end point forms with the horizontal axis L is calculated. Further, if the two reflected images which the candidate selecting part 152c selects are the corneal reflected image 30a and eyeglass reflected image 44, the angle θ2 which the vector B having the corneal reflected image 30a as its start point and the eyeglass reflected image 44 as its end point forms with the horizontal axis L is calculated. Note that, the horizontal axis L may be corrected in accordance with the orientation of the face of the driver. For example, if the face of the driver is tilted when the driver is looking at the screen of a navigation device in the vehicle, the slant of the horizontal axis L may be corrected in accordance with the same.

The area calculating part 152f of the processor 152 calculates the areas of the reflected images for the combination of two reflected images which the candidate selecting part 152c selects. The area calculating part 152f may also for example find the numbers of pixels of the regions of the reflected images on the screen to thereby calculate the areas of the reflected images.

The corneal reflected image identifying part 152g of the processor 152 excludes the eyeglass reflected images of light projected from the light sources 110a, 110b reflected at the eyeglasses based on predetermined features so as to identify the combination of the corneal reflected image, to identify the corneal reflected image to be used for gaze detection. The predetermined features include the distance which the distance calculating part 152d calculates, the angle which the angle calculating part 152e calculates, or the areas which the area calculating part 152f calculates. The corneal reflected image identifying part 152g identifies the combination of the corneal reflected images among the combinations of two reflected images becoming candidates of the corneal reflected images which the candidate selecting part 152c selects based on these features.

The corneal reflected image identifying part 152g preferably identifies the combination of the corneal reflected images from among the reflected images which the feature extracting part 152a extracts based on all of these distance, angle, and area and identifies one corneal reflected image included in the identified combination as the corneal reflected image to be used for gaze detection.

On the other hand, the corneal reflected image identifying part 152g may also identify the combination of the corneal reflected images from among the reflected images which the feature extracting part 152a extracts based on at least one of the distance, angle, and area and identify one corneal reflected image included in the identified combination as the corneal reflected image to be used for gaze detection. However, from the viewpoint of keeping an eyeglass reflected image from ending up being mistakenly detected as a corneal reflected image, the method based on distance is the highest in reliability. The reliability falls in the order of the method based on angle and the method based on area. Therefore, if identifying the corneal reflected images based on one of the distance, angle, and area, it is preferable to identify the corneal reflected images based on distance. Further, if identifying the corneal reflected images based on two of the distance, angle, and area, it is preferable to identify the corneal reflected images based on the distance and angle.

More specifically, the corneal reflected image identifying part 152g excludes a combination of two reflected images where the distance which the distance calculating part 152d calculates exceeds a first threshold value, identifies the combination of two reflected images where the distance is the first threshold value or less as the combination of corneal reflected images, and identifies one reflected image included in the identified combination as the corneal reflected image to be used for gaze detection. Further, the corneal reflected image identifying part 152g excludes a combination of two reflected images where the angle which the angle calculating part 152e calculates exceeds a second threshold value, identifies the combination of two reflected images where the angle is the second threshold value or less as the combination of corneal reflected images, and identifies one reflected image included in the identified combination as the corneal reflected image to be used for gaze detection. Further, the corneal reflected image identifying part 152g excludes a combination of two reflected images where an area which the area calculating part 152f calculates exceeds a third threshold value, identifies the combination of two reflected images where the areas are the third threshold value or less as the combination of corneal reflected images, and identifies one reflected image included in the identified combination as the corneal reflected image to be used for gaze detection.

Note that, gaze detection by the corneal reflection method is possible by using either of the corneal reflected image 30a of the light of the light source 110a reflected at the cornea and the corneal reflected image 30b of the light of the light source 110b reflected at the cornea. By determining which of the corneal reflected image 30a and corneal reflected image 30b to use for gaze detection in advance, the corneal reflected image identifying part 152g identifies one corneal reflected image included in the identified combination of the corneal reflected images as the corneal reflected image to be used for gaze detection.

If identifying the corneal reflected images based on the distance or the area, the threshold value correcting part 152h of the processor 152 corrects the threshold value compared with the distance or area based on the distance from the light source 110a and light source 110b to the face of the driver. The distance between the corneal reflected image 30a and corneal reflected image 30b of light of the light source 110a and light source 110b reflected at the cornea changes in accordance with the distance from the light source 110a and light source 110b to the face of the driver. Similarly, the area of the corneal reflected image 30a of light of the light source 110a reflected at the cornea or the area of the corneal reflected image 30b of light of the light source 110b reflected at the cornea changes in accordance with the distance from the light source 110a and light source 110b to the face of the driver.

For this reason, by correcting the threshold value which is compared with the distance or area based on the distance from the light source 110a and light source 110b to the face of the driver, the precision when identifying the corneal reflected images based on the distance or area is improved more. For example, the threshold value correcting part 152h corrects the above-mentioned first threshold value to a larger value the longer the distance from the light source 110a and light source 110b to the face of the driver. Further, the threshold value correcting part 152h corrects the above-mentioned third threshold value to a larger value the longer the distance from the light source 110a and light source 110b to the face of the driver. The threshold value correcting part 152h corrects these threshold values based on a map or table etc. prescribing in advance the relationship between the distance to the face of the driver and these threshold values. At this time, the threshold value correcting part 152h may also for example estimate the distance from light source 110a and light source 110b to the face of the driver based on a map or table etc. prescribing in advance the relationship between a position of a seat and the distance to the face of the driver based on the position of the seat on which the driver sits. Further, if the camera 120 is comprised of a stereo camera, the threshold value correcting part 152h may also calculate the distance to the face of the driver from the parallax of the left and right images. The threshold value correcting part 152h may also calculate the distance from the light source 110a and light source 110b to the face of the driver in advance before the start of processing for identifying the corneal reflected images, for example, at the time the driver sits down.

The gaze detecting part 152i of the processor 152 detects the gaze of the driver using the corneal reflected image identified by the corneal reflected image identifying part 152g using the above-mentioned known technique (corneal reflection method).

If the result of the gaze of the driver being detected by the gaze detecting part 152i is, for example, that the gaze of the driver is not facing the front for a predetermined time period or more, there is a possibility that the driver is driving while distracted. For this reason, the processor 152 of the control device 150 issues an instruction to display a warning at the display device 130. Due to this, a warning is displayed on the display device 130. Further, the processor 152 of the control device 150 outputs a warning by voice from the speaker 140. For example, a warning of "look ahead!" etc. is displayed at the display device 130 and, further, is emitted from the speaker 140. Due to this, the driver who may be driving while distracted can be prompted to turn his gaze to the front.

FIG. 9 is a flow chart showing the processing which the processor 152 of the control device 150 performs every predetermined control cycle. First, an image generated by the camera 120 capturing the driver is acquired (step S10). Next, the feature extracting part 152a of the processor 152 judges whether the face of the driver appears in the image (step S12). If the face of the driver appears in the image, the feature extracting part 152a judges whether the pupil of an eye of the driver appears in the image (step S14). If at step S12 the face of the driver does not appear in the image or if at step S14 the pupil of an eye of the driver does not appear in the image, the routine returns to step S10.

If at step S14, the pupil of an eye of the driver appears in the image, it is judged whether to select a combination of candidates of the corneal reflected images (step S16), while if selecting a combination of candidates of the corneal reflected images, the candidate selecting part 152c selects a combination of two reflected images becoming candidates of the corneal reflected images (step S18).

On the other hand, as explained above, if there is clearly no eyeglass reflected image present in the image, there is no need for processing for selecting a combination of candidates of the corneal reflected image and identifying the corneal reflected images based on a distance between two points of the reflected images, an angle of a line connecting two points of the reflected images, or the areas of the reflected images. Therefore, in such a case, at step S16, it is judged to not select a combination of candidates of the corneal reflected images, to proceed to step S32, and to detect the gaze based on a predetermined corneal reflected image among two corneal reflected images.

Next, the distance calculating part 152d calculates the distance between the two candidates of reflected images, and the corneal reflected image identifying part 152g judges if the distance between the candidates is the first threshold value or less (step S20). If the distance between the candidates is the first threshold value or less, the angle calculating part 152e calculates the angle formed by the vector between the two candidates of reflected images and the horizontal axis, and the corneal reflected image identifying part 152g judges whether the angle formed between the vector between candidates and the horizontal axis is the second threshold value or less (step S22).

If the angle formed by the vector between candidates and the horizontal axis is the second threshold value or less, the area calculating part 152f calculates the areas of the candidates of the two reflected images, and the corneal reflected image identifying part 152g judges whether the areas of the candidates of the two reflected images are the third threshold value or less (step S24). If the areas of the candidates of the two reflected images are the third threshold value or less, it is judged whether all of the combinations of candidates have been selected (step S26). If all of the combinations of candidates have been selected, the corneal reflected image identifying part 152g identifies the combination of the corneal reflected images from among the combinations of candidates of the corneal reflected images (step S28). Specifically, the corneal reflected image identifying part 152g identifies as the combination of the corneal reflected images the two reflected images with a distance between candidates of the first threshold value or less, an angle formed by the vector between candidates and the horizontal axis of the second threshold value or less, and areas of the third threshold value or less.

Next, the corneal reflected image identifying part 152g identifies one corneal reflected image included in the combination of the corneal reflected images identified at step S26 as the corneal reflected image to be used for gaze detection (step S30).

For example, in the example of FIG. 8, if the corneal reflected image 30a and corneal reflected image 30b are selected as candidates, if the distance between the corneal reflected image 30a and the corneal reflected image 30b is designated as L4, the area of the corneal reflected image 30b is designated as S1, the area of the corneal reflected image 30a is designated at S2, the threshold value of the distance is designated as L, the threshold value of the angle is designated as θ, and the threshold value of the area is designated as S, the conditions of L4≤L, θ1≤θ, and S1≤S and S2≤S are satisfied, so the corneal reflected image 30a and corneal reflected image 30b are identified as the combination of true corneal reflected images and, further, either of the corneal reflected image 30a and the corneal reflected image 30b is identified as the corneal reflected image to be used in gaze detection. On the other hand, if the corneal reflected image 30a and eyeglass reflected image 44 are selected as candidates, at least one of the distance, angle, and area will not satisfy the threshold value, so the corneal reflected image 30a and eyeglass reflected image 44 are never identified as the combination of the corneal reflected images.

If any of the conditions of steps S20, S22, S24, and S26 does not stand, the routine returns to step S18 where the candidate selecting part 152c selects a combination of two reflected images becoming new candidates for corneal reflected images, then the processing of step S20 and on is again performed.

If the corneal reflected image to be used for gaze detection at step S30 is identified, the gaze detecting part 152i performs gaze detection based on the identified corneal reflected image (step S32). After step S32, the processing at the present control cycle ends.

Note that, in the processing of FIG. 9, the processing of judgment is performed in the order of the judgment based on distance (step S20), judgment based on the angle (step S22), and judgment based on the areas (step S24), but the order of judgment is not limited to this. The judgments may be performed by an order different from FIG. 9. Further, the processing of these judgments may also be performed simultaneously (in parallel).

As explained above, according to the present embodiment, by projecting light from the light projecting part 110 having two light sources spaced apart from each other toward an eye of the driver, two corneal reflected images are generated for one eye. Further, by excluding eyeglass reflected images based on the distance between two points of the reflected images, the angle of a line connecting two points of the reflected images, and the areas of the reflected images, eyeglass reflected images are kept from being mistakenly detected as corneal reflected images. Due to this, even in the case of an eyeglass wearer, more accurate gaze detection becomes possible.

Above, suitable embodiments according to the present invention were explained, but the present invention is not limited to these embodiments and can be variously corrected and changed within the language of the claims.

The invention claimed is:

1. A corneal reflected image identifying device comprising
a light projecting part for projecting light from two light sources which are spaced apart from each other toward an eye,
an imaging part for capturing the eye on which light is projected, and
a processor configured to:
calculate a distance between two reflected images for each combination of two reflected images among a plurality of reflected images obtained by light projected from the light sources being reflected in a vicinity of the eye by using the captured image; and
exclude a reflected image of light projected from a light source being reflected by an object covering the eye based on predetermined features and identify a corneal reflected image to be used for gaze detection; wherein
the predetermined features include the distance which the processor has calculated;
wherein the processor is further configured to exclude a combination of two reflected images where the distance exceeds a first threshold value and to identify one reflected image included in a combination of two reflected images where the distance is the first threshold value or less as the corneal reflected image to be used for gaze detection;
calculate an angle of a line connecting two reflected images with a line connecting the two light sources when viewed from the imaging direction of the imaging part for each combination of two reflected images, the predetermined feature includes the angle; and
exclude a combination of two reflected images where the angle exceeds a second threshold value and identify one reflected image included in a combination of two reflected images where the angle is the second threshold value or less as the corneal reflected image to be used for gaze detection.

2. The corneal reflected image identifying device according to claim 1, wherein the processor is further configured to:
calculate an area of a reflected image for each combination of two reflected images, the predetermined feature includes the area; and
exclude a combination of two reflected images where an area exceeds a third threshold value and identify one reflected image included in a combination of two reflected images where the areas are the third threshold value or less as the corneal reflected image to be used for gaze detection.

3. The corneal reflected image identifying device according to claim 1, wherein the processor is further configured to correct the first threshold value to a larger value the longer a distance from the light sources to the face.

4. The corneal reflected image identifying device according to claim 2, wherein the processor is further configured to correct the third threshold value to a larger value the longer a distance from the light sources to the face.

5. A gaze detection device comprising a processor configured to detect a gaze by a corneal reflection method based on a corneal reflected image identified by a corneal reflected image identifying device according to claim 1.

* * * * *